United States Patent
Smith et al.

(10) Patent No.: US 6,558,091 B2
(45) Date of Patent: May 6, 2003

(54) PLUNGE BASE ROUTER

(75) Inventors: Kenneth Smith, Bayboro, NC (US); Lawrence M. Cotton, New Bern, NC (US); Kevin Alfred, New Bern, NC (US)

(73) Assignee: S-B Power Tool Company, Broadview, IL (US)

( * ) Notice: Subject to any disclaimer, the term of this patent is extended or adjusted under 35 U.S.C. 154(b) by 0 days.

(21) Appl. No.: 10/230,537

(22) Filed: Aug. 29, 2002

(65) Prior Publication Data

US 2003/0007843 A1 Jan. 9, 2003

Related U.S. Application Data

(62) Division of application No. 09/627,497, filed on Jul. 28, 2000, now Pat. No. 6,488,455.

(51) Int. Cl.[7] ................................. B23C 1/20
(52) U.S. Cl. ............... 409/204; 144/136.95; 144/154.5; 409/182; 409/206; 409/214
(58) Field of Search ............... 408/14, 110, 111, 408/113, 241 S; 409/182, 204, 206, 209, 210, 214, 218; 144/136.95, 154.5

(56) References Cited

U.S. PATENT DOCUMENTS

| | | | |
|---|---|---|---|
| 4,652,191 A | * | 3/1987 | Bernier ........................ 409/182 |
| 4,770,573 A | * | 9/1988 | Monobe ....................... 409/182 |
| 5,853,274 A | * | 12/1998 | Coffey et al. ................. 409/182 |

* cited by examiner

Primary Examiner—Daniel W. Howell
(74) Attorney, Agent, or Firm—Gardner Carton & Douglas

(57) ABSTRACT

A plunge base router for use in an upright and an inverted position is disclosed. The router includes a depth adjustment mechanism, a depth stop mechanism, a post lock mechanism, and a return spring defeat mechanism. The depth adjustment mechanism includes a course adjustment mechanism and a fine adjustment mechanism to set the cutting distance of a bit. The course and fine adjustment mechanisms are usable in both the upright and inverted positions and the fine adjustment mechanism is operable without being reset throughout the full range of motion of the plunge router. The depth stop includes a mechanism for locking the end of a rod on the housing to the base in order to set the relative position in between the housing and the base. The depth stop also includes a plurality of steps for engaging the rod and permitting incremental passes of cutting at different depths with the router. The post lock mechanism includes a lever for locking the housing to the guide posts in a relative position relative to the base, and the lever is normally biased to the lock position. The lever includes a latch for locking the lever in the open positions so that the plunger can be easily mounted in an inverted position under a worktable without the need to hold down the lever in order to permit relative movement between the housing and the base. The return spring defeat mechanism defeats the return spring that biases the housing away from the base so that it is easier to mount the plunge router in an inverted position on the underside of a worktable.

8 Claims, 9 Drawing Sheets

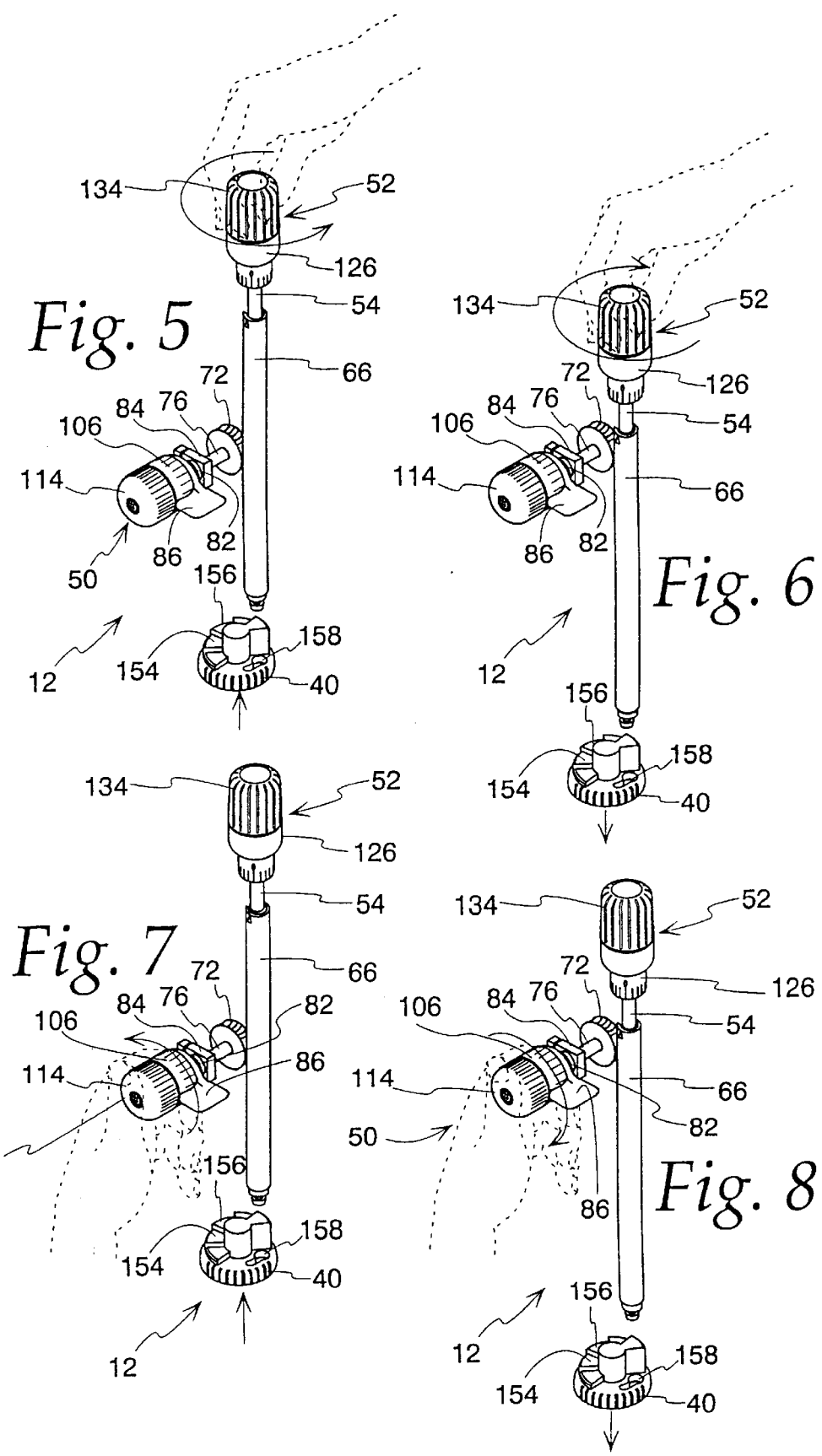

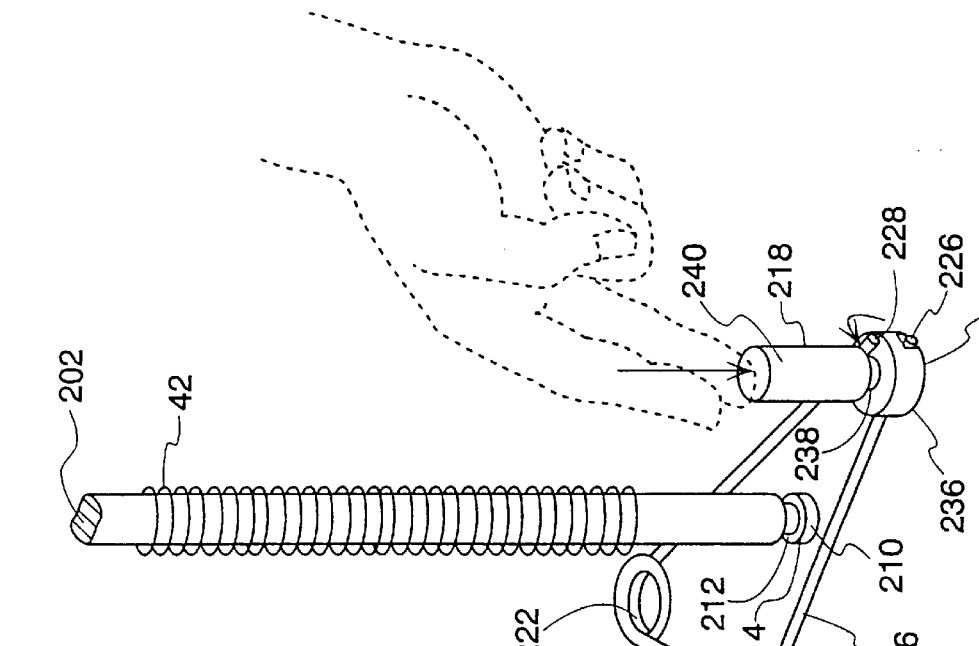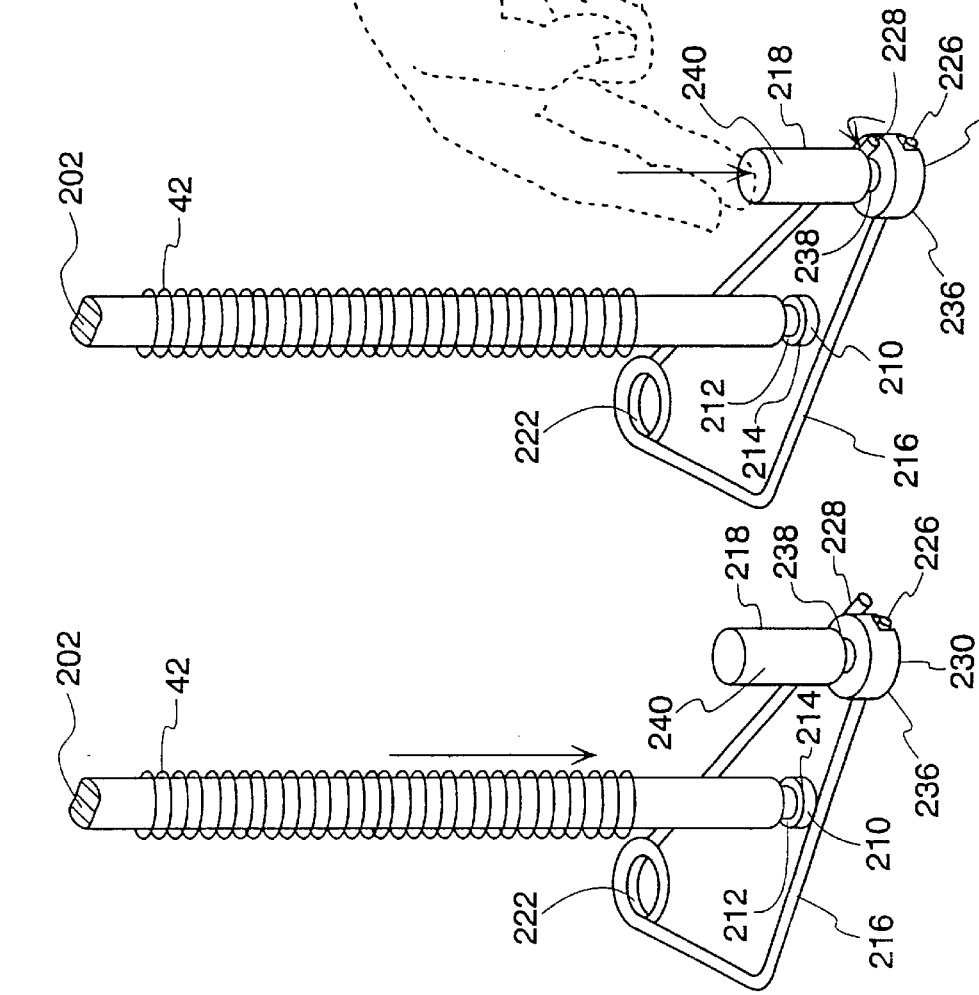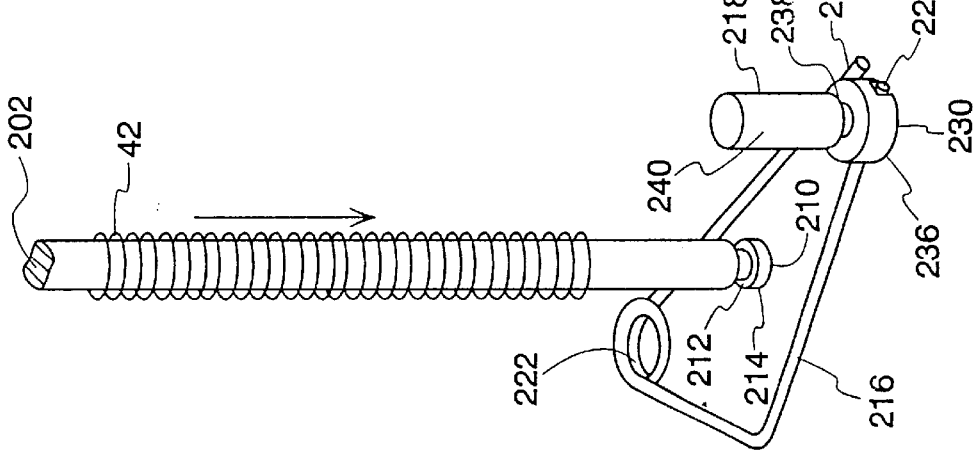

PLUNGE BASE ROUTER

CROSS-REFERENCE TO RELATED APPLICATION

This application is a divisional of U.S. Ser. No. 09/627,497 filed Jul. 28, 2000, now U.S. Pat. No. 6,488,455.

BACKGROUND OF THE INVENTION

1. Field of the Invention

The present invention relates to a plunge base router and, in particular, to a plunge base having a number of advantageous features for facilitating use of the router in either an upright position or an inverted position. The inventive features of the plunge router of the present invention include a depth adjustment mechanism, a depth stop mechanism, a post-lock mechanism, and a return spring defeat mechanism.

2. Scope of the Prior Art

Plunge base routers have long been used to make grooves and cuts of various types. Such routers include a housing having a motor which rotates a router bit for making grooves and cuts in a work. The housing is vertically movable relative a base on two guide posts that are connected to the base. It is known that a plunge base router can be used in an upright (or normal position) and an inverted position for use under a router table. In the upright position, the router can plunge on the posts and is used to make cutouts, for grooving and edge-forming of wood or other solid-surface materials. When the router is mounted under the table, it is used like a shaper mainly for cutting repetitive shapes and for heavy decorative edge-cuts. When used in the upright position, the term cutting depth is used to describe the amount that the bit is exposed through the base. When used in the inverted position, the term cutting height describes the amount that the bit is exposed above the router table.

Typically, the housing of the plunge base router is slidable on the guide posts to permit plunging of the router and positioning of the housing relative to the base. The housing contains a compression spring adjacent to at least one of the guide posts for biasing the housing away from the base. The compression spring may be on the outside or inside of the post.

Most plunge base routers provide a depth adjustment mechanism to accurately position the bit at the correct cutting depth or height. Some routers provide a course adjustment mechanism to generally find the depth or height and a fine adjustment mechanism to accurately locate the depth or height. The course and fine adjustment mechanisms are both used to arrange the router for the desired cutting depth or height.

The prior art plunge base routers typically include a fine adjustment mechanism that is separate from the course adjustment mechanism. In such mechanisms, the fine adjustment mechanism typically has a short range of travel for fine tuning the adjustment of the course adjustment mechanism. Thus, if it is determined after making a cut that a larger adjustment is needed, both the course adjustment mechanism and the fine adjustment mechanism must be reset. The process of resetting both the course and fine adjustment mechanisms is fairly time consuming because both adjustment mechanisms must be zeroed again and the cutting depth or height completely reset. It is therefore believed to be desirable to have a plunge base router where the course and fine adjustment mechanisms are interdependent so that they do not have to be reset and zeroed repetitively.

A number of prior art plunge base routers are shown in issued U.S. Patents. For example, U.S. Pat. No. 4,770,573 to Monobe et al. discloses a plunge base router that uses a bolt and nut mechanism for course adjustment. The nut mechanism moves between a released position so that the plunge base router can be adjusted and a locked position to hold the bolt. The upper end of the bolt includes a knob for fine adjustment of the router. U.S. Pat. No. 4,938,264 to Ferenczffy discloses a clamping screw for use as a course adjustment mechanism. U.S. Pat. No. 5,191,921 to McCurry discloses a pinion and gear arrangement as a course adjustment mechanism. However, in each of these constructions, the fine adjustment mechanism has a limited travel length, and both the course and fine adjustment mechanisms may need to be reset and zeroed repetitively in order to arrive at the final cutting depth or height.

In prior art constructions, it can be difficult to adjust the cutting height of the plunge base router when the router is in an inverted position due to the weight of the router. The operator often finds it awkward to reach under a router table to press up on the router when adjusting the cutting height. It is therefore believed to be desirable to have a plunge base router that assists the operator with supporting the weight of the router during adjustment of the router in the inverted position.

After a final cutting height or depth is established, most plunge base routers include a post lock lever for locking the router in a selected position. The post lock lever is normally biased to the locked position, and the user must press on the post lock lever to release a locking mechanism so that the housing can be moved relative to the base. However, pressing the post lock lever when the router is in the inverted position and mounted under a router table can be awkward and difficult. It is therefore believed to be desirable to incorporate a mechanism for holding the post lock lever in the released position for easier adjustment of the router.

Plunge base routers typically have a compression spring that biases the housing away from the base and this compression spring can make it more difficult to mount the plunge base router in the inverted position under a router table. In particular, when an operator is mounting the router in the inverted position under a router table, the operator must hold the substantial weight of the router as well as push against the force of the compression spring in order to mount the router in the inverted position. Effectively, the compression spring adds to the weight of the router when an operator mounts it for inverted use. It is therefore believed to be desirable to provide a mechanism for defeating the force of the compression spring when the router is to be used in the inverted position.

SUMMARY OF THE INVENTION

The plunge base router of the present invention is particularly suited for use in either an upright position or an inverted position under a router table. The router includes several advantageous features to facilitate such use, and includes an advantageous mechanism for adjusting the cutting depth or height of the router. The router includes a base, a motor to rotate a bit, and a housing encasing the motor and being movable relative to the base on at least one guide post for adjustment of a cutting depth or height of the bit. The router further includes a return spring for providing a spring force between the base and the housing and biasing the housing away from the base.

In an embodiment, the router includes a means for defeating the spring force of the return spring on the router. The return spring defeat means is particularly advantageous for using the router in an inverted position because the operator does not need to struggle against both the weight of the router and the force of the return spring when mounting the router under a router table.

In an embodiment, the return spring defeat means includes a spring rod mounted within the return spring and having a first end engaging the return spring and second end having a groove and a head. A spring clip is movably mounted in the base and is movable between a first position not engaged with the spring rod and a second position engaged in the groove in the spring rod to vertically lock the spring rod and to defeat the return spring. When the spring rod is vertically locked, the first end of the spring rod that engages the return spring holds the return spring in a compressed condition or state so that its spring force is defeated. The base further includes a button that engages the spring clip and is adapted to selectively move the spring clip between the first position in which it does not engage the spring rod and the second position in which it engages the spring rod and defeats the return spring.

In an embodiment, the first or top end of the spring rod includes a snap ring that engages the top of the return spring, and when the spring clip locks the spring rod, the snap ring holds the return spring in the compressed state or condition.

In an embodiment, the spring clip includes first, second and third legs that form a triangle. The first leg extends under the button and biases the button toward the upward position. The second leg includes a free end that rides along the side of the button. The button includes a top portion that can be depressed by the operator, a small diameter mid-portion, and a large diameter bottom portion. In use, the button is depressed so that the free end of the spring clip moves into the smaller diameter mid-portion and the free end also engages the groove in the spring rod to vertically lock it in position. The button can then be depressed again so that the free end of the spring clip is moved adjacent to the larger diameter portion and the spring clip is moved away from the spring rod so that it does not lock it in position.

In an embodiment, the plunge base router of the present invention includes both a course adjustment and a fine adjustment mechanism. The adjustment mechanisms include a rod vertically mounted on the housing and being axially movable relative to the housing to set a cutting depth of the router. The rod preferably takes the form of a worm rod having a threaded portion. A course adjustment knob is connected to a gear mounted within the housing and the gear engages the threaded portion of the worm rod. The course adjustment knob and gear are rotatable to cause axial movement of the rod relative to the housing. A gear lock lever is also provided for locking the course adjustment knob and gear in a selected position. When the course adjustment knob and gear are locked in a selected position, the gear acts as a nut against which the worm rod can travel.

The depth adjustment mechanism further includes a fine adjustment knob secured to the rod for rotating the rod around its longitudinal axis. The fine adjustment knob and rod are rotatable, when the gear lever locks the gear in the selected position, to cause axial movement of the rod relative to the housing.

In use, the course and fine adjustment mechanism are used to adjust the position of the rod relative to the housing so that a free end of the rod is positioned a selected distance away from a surface on the base of the router. When the router is plunged, the free end of the rod hits the surface on the base and sets the cutting height or depth of the router.

In an embodiment, the router includes a rotatable depth stop mounted on the base under the worm rod. The rotatable depth lock includes a surface for engaging the rod and fixing the relative position of the housing with respect to the base to set the cutting depth or height of the router.

In an embodiment, the rotatable depth lock also includes a protrusion adapted for engaging a groove on the free end of the rod and locking the rod to the base. The depth lock is rotatable between a first position in which the protrusion engages the groove on the free end of the rod and locks the rod to the base, and a second position in which the protrusion does not engage the groove in order to allow axial movement of the rod. The rotatable depth lock is advantageously used to lock the rod to the base when it is desired to use the plunge base router in an inverted position. In the inverted position, the rod that is fixed to both the housing and the base help support the weight of the housing and motor, which makes it easier for the operator to adjust the cutting height or depth of the router.

In an embodiment, the depth stop includes a keyhole having a first opening large enough to receive the head and groove of the worm rod, and a second opening smaller than the head of the worm rod and being defined by the protrusion that engages the groove of the rod to lock the rod to the base. In use, the head of the rod are inserted into the first opening, and then the rotatable depth stop is rotated so that the protrusion of the second opening engages the groove and locks the rod to the base.

The rotatable depth stop may also include a recess on its underside for trapping the head on the rod. This prevents the rod from becoming dislodged for the rotatable depth stop during use of the router.

In an embodiment, the plunge base router includes a post lock lever and a means for holding the post lock lever in the released position. The post lock lever includes a lock element movable between a locked position wherein the housing is fixed relative to the base and a released position wherein the housing is movable relative to the base. A torsion spring biases the post lock lever and lock element into the lock position. A latch is provided that is movable to secure the post lock lever and lock element in the released position when desired. The latch is particularly useful for holding the post lock lever in the released position when it is desired to mount the router in an inverted position under a router table.

In an embodiment, the latch is mounted on the post lock lever, and a pin pivotally secures the latch to the lever. The latch includes a distal end that can project outwardly from the lever to engage a boss on the housing and hold the post lock lever in the released position. A second spring may be provided for biasing one end of the latch outward, and that end of the latch can then be depressed so that the latch pivots and the distal end engages the boss on the housing. The latch is particularly advantageous for defeating the post lock lever and holding it in the released position when it is desired to use the plunge base router in the inverted position under a router table.

These and numerous other features and advantages of the present invention will become readily apparent from the following description, the accompanying drawings and the appended claims.

BRIEF DESCRIPTION OF THE DRAWINGS

FIG. 5 illustrates operation of the fine adjustment mechanism;

FIG. 6 illustrates a further view for the operation of the fine adjustment mechanism;

FIG. 7 illustrates operation of the course adjustment mechanism;

FIG. 8 illustrates a further view for the operation of the course adjustment mechanism;

FIG. 15 shows the return spring defeat mechanism where the rod is being plunged and the spring clip is in its outward position;

FIG. 16 shows the return spring defeat mechanism where the rod is in its lowest position;

FIG. 17 shows the return spring defeat mechanism where the smallest diameter of the button is aligned with the spring clip;

DETAILED DESCRIPTION OF THE PREFERRED EMBODIMENTS

Figure 1:
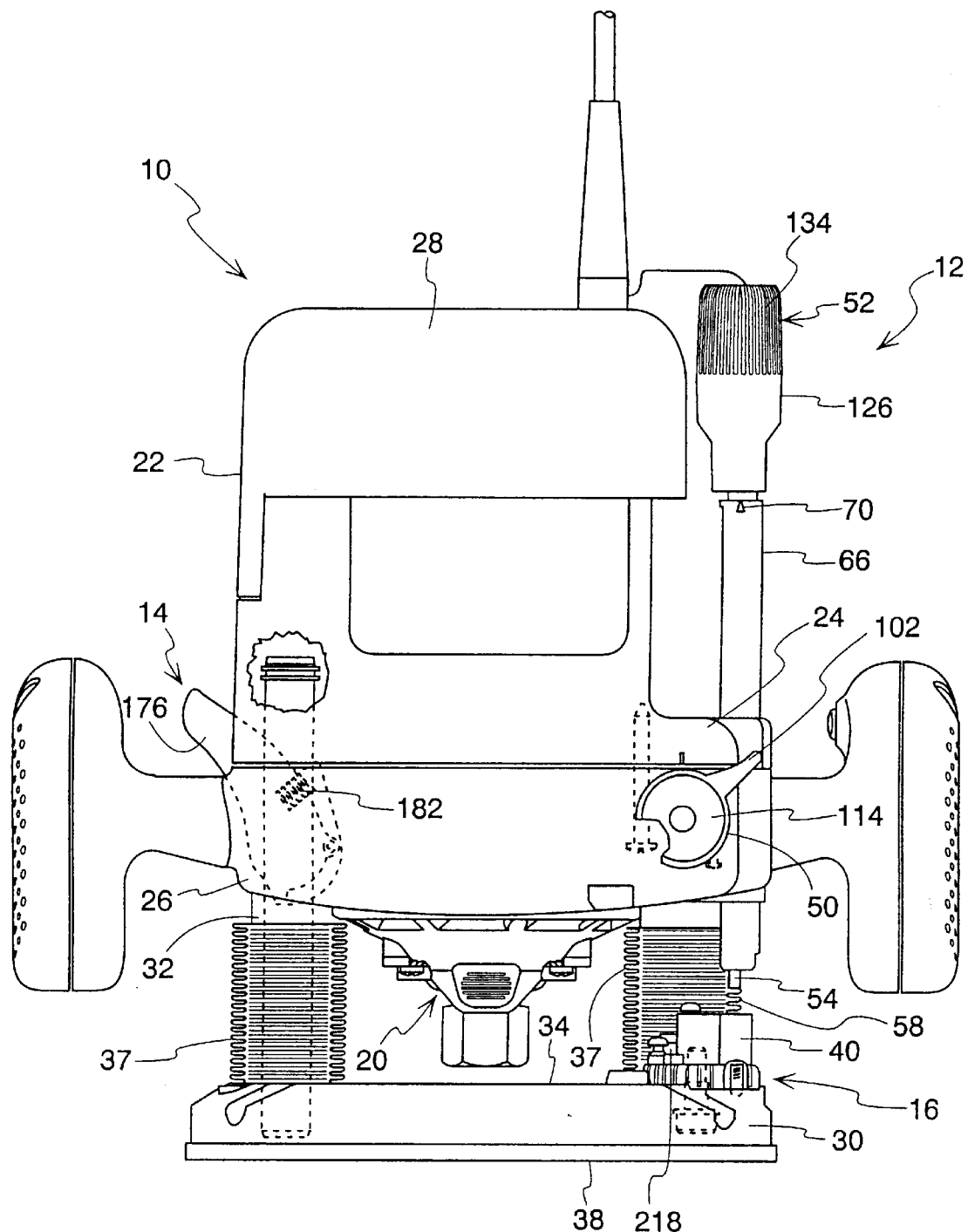
FIG. 1 illustrates a plunge base router made in accordance with the principles of the present invention.
Figure 2:
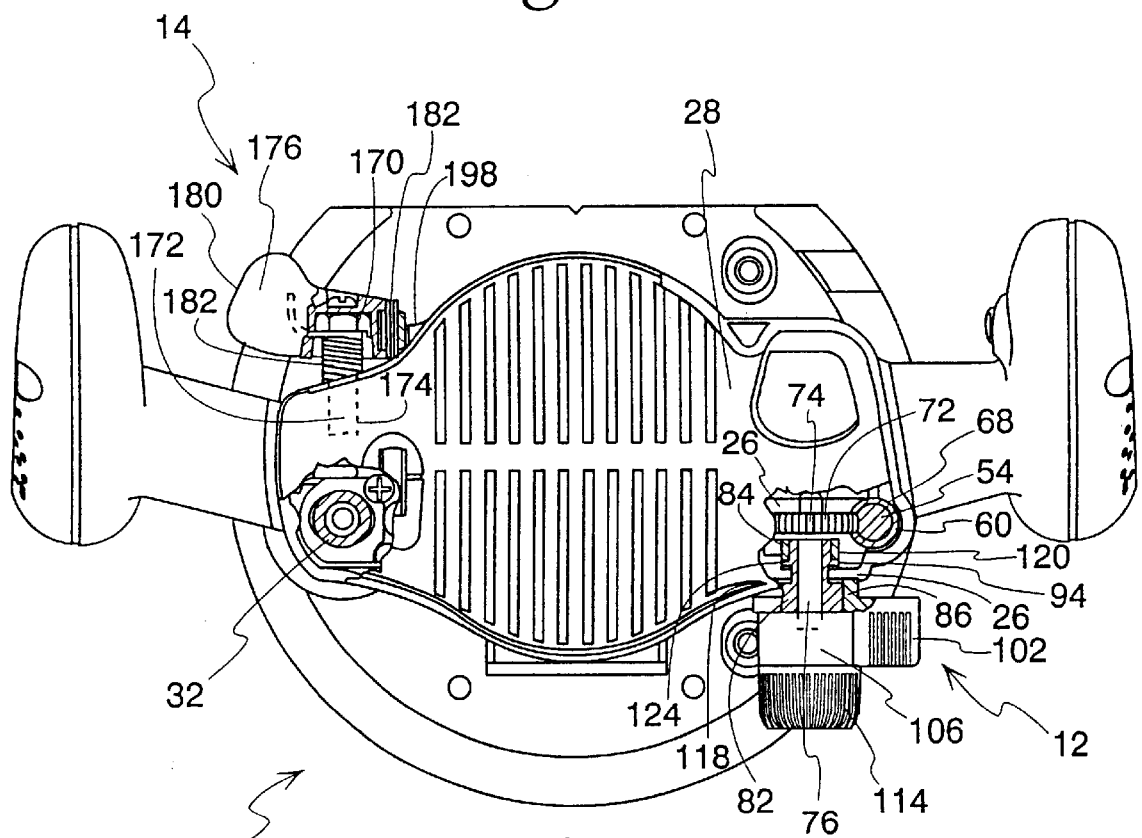
FIG. 2 shows a top view of the plunge base router with a partial cut-away portion in the vicinity of the course adjustment mechanism.
Figure 3:
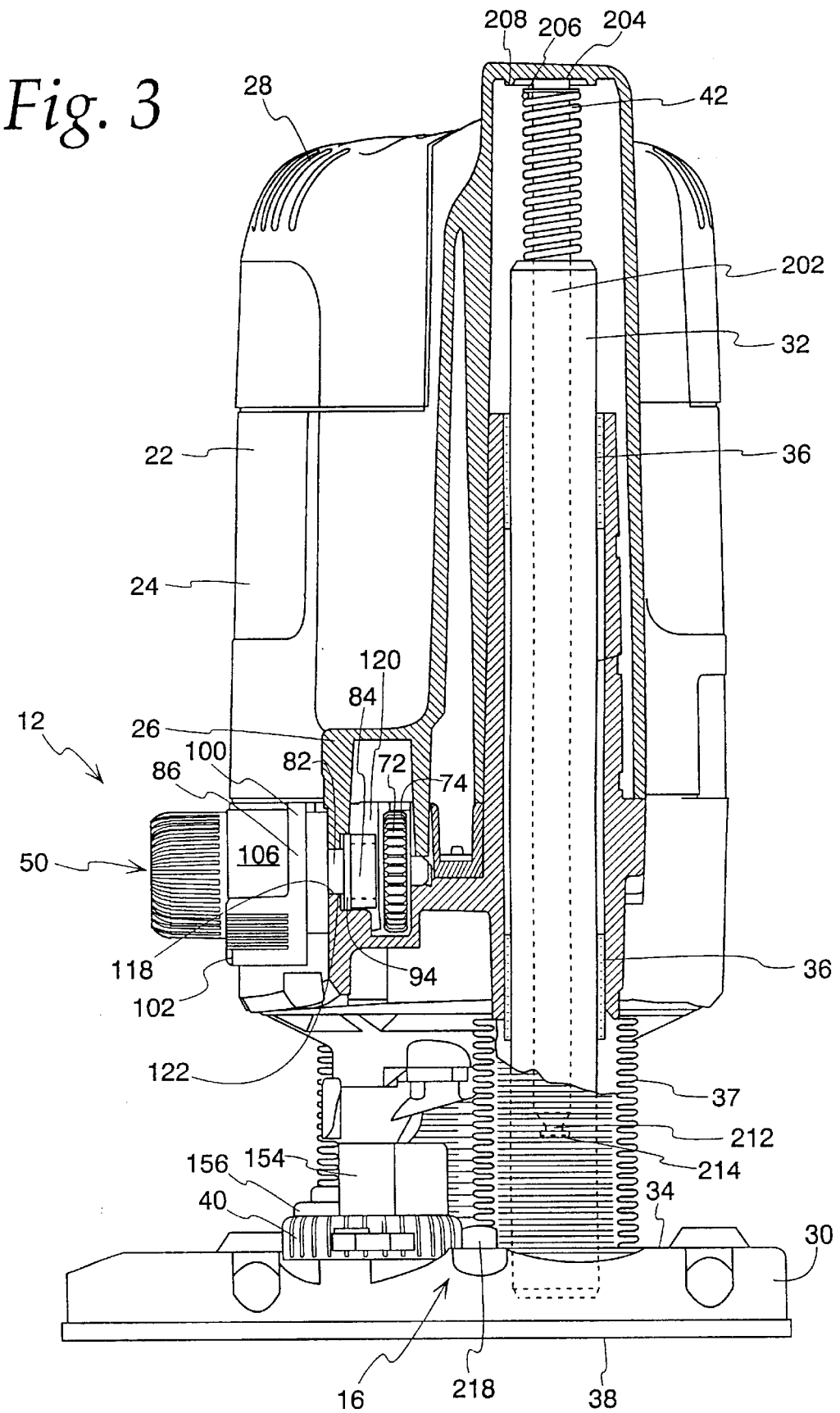
FIG. 3 is a cross-sectional view of the router taken along the line 3–3 in FIG. 1.

Referring to FIGS. 1–3, the numeral 10 designates a plunge base router 10 including a motor (not shown) that rotates a router bit (not shown). A shaft lock assembly 20 is connected to the motor to hold and rotate the bit. The motor is encased by a housing 22, which includes a main housing 24, a fan housing 26 and a cover 28. The router 10 also includes a base 30 that has at least two guide posts 32 attached to it. The posts 32 extend perpendicularly from the upper surface 34 of the base 30 and extend into holes (not shown) formed in the housing 22. The housing 22 is movable in a longitudinal direction along the posts 32 relative to the base 30 and bushings 36 (FIG. 3) assist in the movement of the housing 22 along the guide posts 32. Bellows 37 are provided between the bottom of the housing 22 and the upper surface 34 of the base 30 to protect the guide posts 32 from the debris and dust created by use of the router 10.

Depth Adjustment Mechanism

Referring to FIGS. 1 and 4–8, the numeral 12 generally designates a depth adjustment mechanism to position the router bit with respect to the base 30. As best shown in FIGS. 4–8, the depth adjustment mechanism 12 includes a course adjustment mechanism 50 and a fine adjustment mechanism 52. The user operates mechanisms 50 and 52 to set the cutting depth or height of the router bit.

The course adjustment mechanism 50 includes a worm rod 54 that has an upper end 56 and a lower end 58. The worm rod 54 includes a threaded portion 60 between the ends 56 and 58. At the upper end 56, the worm rod 54 also includes a flat section 62 that forms a generally D-shaped cross-section. A groove 63 extends around the circumference of the lower end 58 of the rod 54 to form a cap 64.

An elongated sleeve 66 having a longitudinal slot 68 surrounds the rod 54 so that the threaded portion 60 adjacent the housing 22 is exposed by the slot 68. The sleeve 66 fits into a hole with a key (not shown) provided in the housing and will not turn when the worm rod 54 is rotated. The sleeve 66 is shorter than the worm rod 54 so that the upper end 56 and the lower end 58 of worm rod 54 extend out of the ends of the sleeve 66. The sleeve 66 protects the threaded portion 60 on the rod 54 from the debris and dust created by the router 10. The sleeve 66 also grips the threaded portion 60 to resist rotation of rod 54 due to vibration during use of the router.

The course adjustment mechanism 50 also includes a gear 72 having gear teeth 74 engaged with the threaded portion 60 of worm rod 54. The gear 72 is mounted on one end of gear shaft 76, and the opposing end of gear shaft 76 includes a flat section 78 having a generally D-shaped cross-section. A course adjustment knob 114 is fitted onto the generally D-shaped end 78 of shaft 76, and rotation of knob 114 causes gear 74 to engage and travel along the threaded portion 60 on shaft 54.

As shown most clearly in FIGS. 2 and 3, the shaft 76 and gear 74 are fixed within housing 22 of router 10. Accordingly, rotation of knob 114 and gear 74 causes relative movement between the housing 22 and rod 54.

The course adjustment mechanism 50 is provided with a lock assembly 80 (FIG. 4) that may be operated to prevent the gear 74 from rotating. The assembly 80 includes a gear lock screw 82, a nut 84 and a lever 86. The gear lock screw 82 has a hexagonal-head end 88 and a threaded end 90. In a preferred embodiment, the threads on the threaded end 90 are left-handed. The screw 82 also has a center hole 92 extending longitudinally along its axis between head end 88 and threaded end 90. A circumferential flange 94 is positioned between the head end 88 and the threaded end 90 creating a groove 96 between the head end 88 and the flange 94.

The nut 84 of lock assembly 80 has a threaded center hole 98 which threads onto the threaded end 90 of the gear lock screw 82. The lever 86 of lock assembly 80 includes a circular portion 100 and a lever 102. The circular portion 100 defines a hexagonal hole 104 that surrounds and engages the hexagonal-head end 88 of the gear screw 82.

As assembled, the gear shaft 76 fits through the longitudinal hole 92 of the gear lock screw 82 such that the flat section 78 extends out of the assembly. An indicator ring 106 having a center hole 108 slides over the end of the gear shaft 76. The knob 114 is then connected to the flat section 78 of shaft 76, and screw 116 secures the knob 114 and indicator ring 106 on the gear shaft 76. In a known manner, the indicator ring 106 is rotatably connected to the knob 114 to zero the course adjustment mechanism 50. The indicator ring 106 can be rotated independently from the knob 114, but rotation of knob 114 causes rotation of the indicator ring 106.

FIGS. 2 and 3 most clearly illustrate the positioning of the course adjustment mechanism 50 within housing 22. The housing 22 defines a hole 118 and a cavity 120, and the hole 118 is preferably in the fan housing 26. The gear shaft 76 and gear lock screw 82 extend through the hole 118 in the fan housing 26. The fan housing 26 fits within the groove 96 between the hexagonal end 88 and the flange 94 of the gear lock screw 82. A washer 122 can be used between the gear lock screw 82 and the housing 22 to prevent galling between the housing 26 and the screw 82. The gear 72, the threaded end 90 of the gear lock screw 82 and the nut 84 are disposed within the cavity 120 of the housing. In contrast, the lever portion 86, the head end 88 of the gear lock screw 82, the indicator ring 106 and the knob 114 are disposed outside the housing 22.

Figure 4:
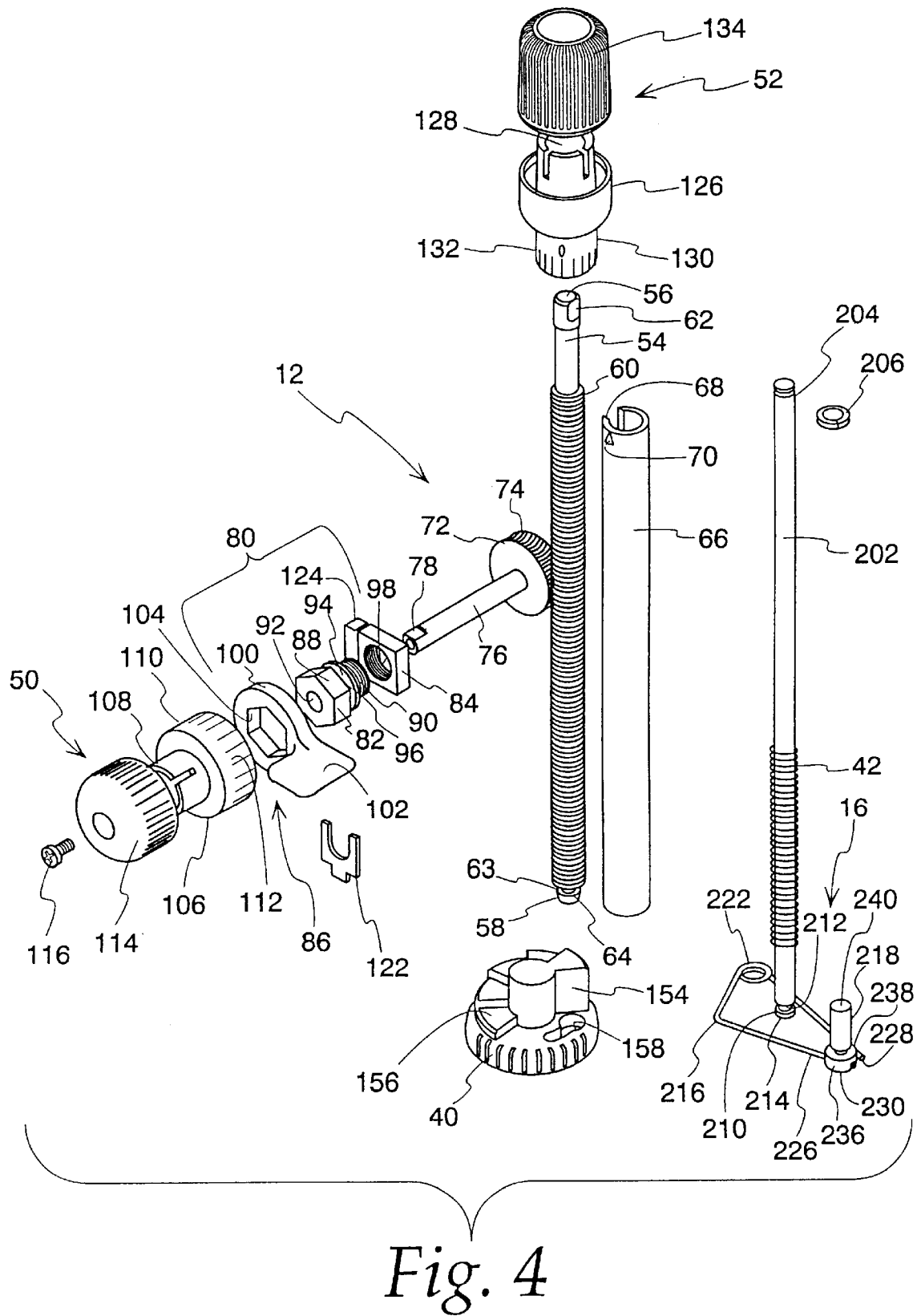
FIG. 4 is a perspective view of the course adjustment mechanism, fine adjustment mechanism and return spring defeat mechanism of the present invention.

Referring to FIGS. 2 and 4, a spring 124 is connected to an outer edge of the nut 84 and biases the nut 84 and gear 72 towards the worm rod 54. Thus, the spring 124 takes up the backlash and play between the gear 72 and the worm rod 54. When the lever 22 is rotated clockwise, the gear lock screw 82 presses the nut 84 against the gear 72 and locks gear 72 against housing 26. In a preferred embodiment, the outer face of the gear 72 is waffled (not shown) to help lock the gear 72 against the housing 26 and to prevent rotation. Once the gear 72 is locked in place, the gear 72, and the gear teeth 74, act like a nut for the worm rod 54 and teeth 60.

Referring to FIGS. 4–8, the fine adjustment mechanism 52 is connected to the upper end 56 of the worm rod 58. The fine adjustment mechanism 52 includes a indicator ring 126 having a center hole 128 fitted over the worm rod 54 and having a scale 130 with multiple indicator marks 132. A fine adjustment knob 134 is connected to the flat section 62 of the worm rod 54. In a known manner, the knob 134 and indicator 126 are arranged so that the indicator ring 126 can rotate independently of the knob 134, but rotation of knob 134 causes rotation of indicator ring 126.

When rotated, the knob 134 rotates the worm rod 54, and indicator ring 126 having the scale 130 with multiple indicator marks 132 on indicator ring 126 is used to zero the fine adjustment knob 134 and to provide a benchmark for fine adjustment of the cutting depth or height of the router 10. The sleeve 66 includes an indicator mark 70 which is used as a reference for the fine adjustment mechanism 52.

The fine adjustment mechanism 52 is used after the course adjustment mechanism 50 is adjusted and in the locked position with gear 72 locked against housing 26. In that position, the gear 72 acts as a nut, and rotation of fine adjustment knob 134 and worm rod 54 causes relative movement between the worm rod 54 and the housing 22.

When the router 10 is used in the upright position, the housing 22 is plungable on guide rods 32 to the desired cutting depth. As shown most clearly in FIG. 1, the worm rod 54 has its second free end 58 projecting downwardly from housing 22 and above a surface (depth stop 40 described in more detail below) on base 30. The housing 22 is plunged with respect to the base 30, and the worm rod 54 and its second free end 58 contact the surface on the base to stop the plunging action at the correct depth which is set by the relative position between worm rod 54 and the housing 22.

In order to adjust the relative position between worm rod 54 and housing 22, the user first turns the course adjustment knob 114 and gear 72 to cause relative movement between the housing 22 and worm rod 54. Thereafter, the user turns lever 102 to lock gear 72 against the housing 26. The fine adjustment knob 134 can then be turned to rotate worm rod 54 and fine tune the relative positioning of worm rod 54 with respect to the housing 22.

The above described course adjustment mechanism 50 and fine adjustment mechanism 52 are particularly advantageous because the fine adjustment mechanism 52 is operable at almost any point along the entire range of movement of the housing 22 with respect to the worm rod 54. Accordingly, in order to fine tune the cutting depth or height, the operator can use just the fine adjustment mechanism 52 to accomplish that goal without the need to reset and zero both the course adjustment and fine adjustment mechanisms for each adjustment, which is common in prior art plunge base routers.

Depth Stop

Referring to FIG. 1, the depth stop 40 forms a surface on base 30 for engaging the second free end 58 of worm rod 54, when the router is plunged, in order to set the cutting depth or height of the router 10. The depth stop 40 is used in this manner, mostly for use in the upright or normal position of the router 10. Advantageously, the depth stop 40 of the present invention can also be used to secure the base 30 to the free end 58 of worm rod 54 for providing an alternate mechanism for adjusting the cutting depth or height of the router 10. This mechanism is particularly advantageously for use of the router 10 in the inverted position.

Figure 9:
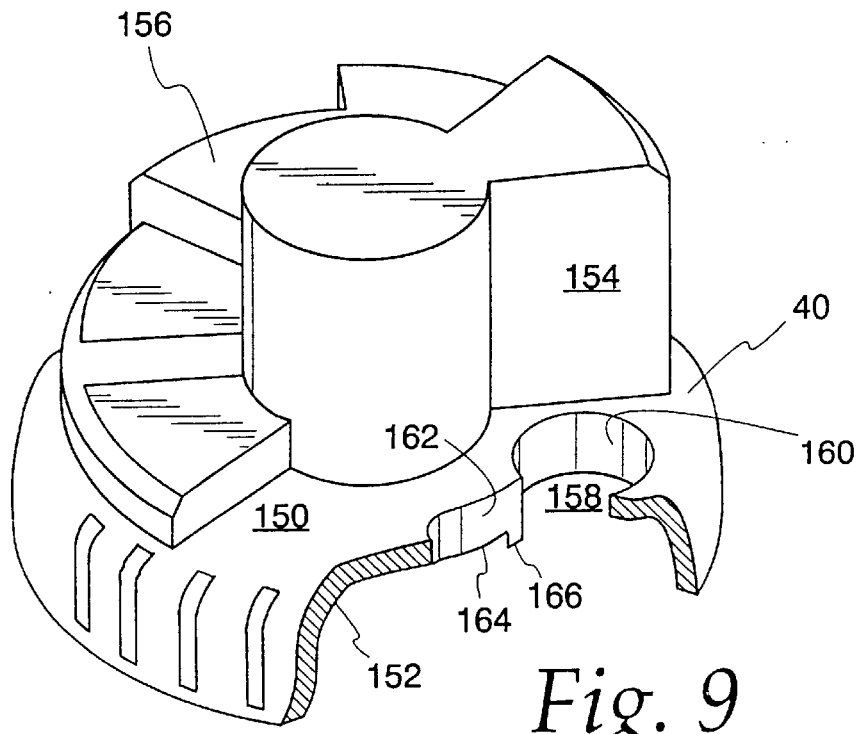
FIG. 9 is a partial cut-away view of the depth stop used as a part of the present invention
Figure 10:
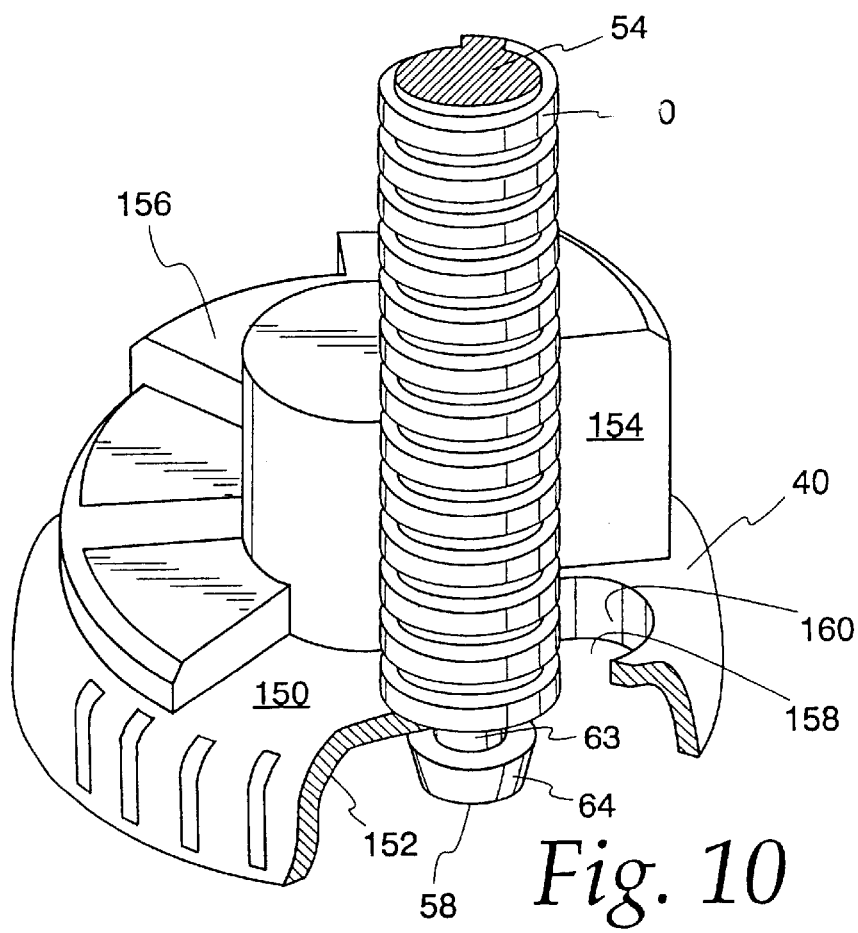
FIG. 10 is a view of the depth stop shown in FIG. 9 where the worm rod is inserted into the keyhole.

As shown most clearly in FIGS. 9 and 10, the depth stop 40 is a generally circular piece that has an upper end 150 and a lower end 152 and is rotationally connected to the base in a known manner. The upper end 150 of depth stop 40 has a turret assembly 154 with multiple steps 156, for positioning under the worm rod 54 in a known manner for setting the cutting height or depth.

The depth stop 40 of the present invention further includes a keyhole 158 having a first larger diameter section 160 and a second smaller diameter section 162. The first section 160 is large enough for the lower end 58 of the worm rod 54 to be inserted into the depth stop 40. The second section 162 is approximately the same as, or slightly larger than, the diameter of the groove 63 under cap 64 on the worm rod 54. In order to lock the worm rod 54 to depth stop 40, the worm rod 54 is first inserted into the first section 160 of the depth stop 40, and then the depth stop 40 is rotated so that the groove 63 on worm rod 54 is inserted into the second section 162 of depth stop 40. The wall of the depth stop 40 that defines the second section 162 acts as a projection to engage groove 63 on the worm rod 54 and to lock the worm rod 54 to the depth stop 40.

As shown most clearly in FIGS. 9 and 10, the depth stop 40 also includes an indent 164 on the lower end 152 in the vicinity of the second section 162. The indent 164 receives the cap 64 on worm rod 54, and provides a lip 166 to secure the worm rod 54 in the second section 162. This minimizes the tendency of the depth stop 40 to rotate when the worm rod 54 is in the second section 162 and prevents the worm rod 54 from being dislodged from the depth stop 40.

When the router 10 is in an upright position, as seen in FIGS. 5–8, the depth stop 40 acts as a contact surface on base 30 for engaging worm rod 54 and stopping relative movement between the housing 22 and base 30. In use, the operator first positions the end of the router bit against the material to be cut. The post lock mechanism 14 (discussed below) is then locked. The worm rod 54 is then positioned against the top of the depth stop 40. The course adjustment mechanism 50 and the fine adjustment mechanism 52 are then zeroed by rotating the indicator rings 106 and 126, respectively. The course adjustment knob 114 is then put into a released position and rotated to find the approximate cutting depth. The knob 114 is used to set a distance between the bottom of the worm rod 54 and the top of the depth stop 40, which is the general cutting distance. The lever 102 is then rotated to lock the gear 72 and the course adjustment mechanism. The fine adjustment knob 134 is then rotated so that worm gear 54 travels upward or downward against fixed gear 72 to fine tune the adjustment of the cutting depth. The fine adjustment knob 134 can be used to rotate and adjust the worm rod 54 along its complete threaded length 60 to permit a wide range of adjustment with the fine adjustment mechanism.

After final adjustment of the cutting depth, the post lock lever mechanism 14 is released and the housing 22 will travel to its furthest point away from the base 30. The router 10 can be plunged downward so that the bottom end 58 of worm rod 54 hits the depth stop 40 at the correct cutting distance within a work. The depth stop 40 can also be rotated to align a selected one of the multiple steps 156 with the bottom end 58 of worm rod 54 in order to make a number of incremental cuts in the work before achieving the final cutting depth. The depth stop 40 has a spring loaded detent mechanism (not shown) for holding the depth stop 40 in different rotational positions.

When the router 10 is used in the inverted position, the operator may advantageously lock the worm rod 54 in the keyhole 158 in the depth stop 40. In particular, the cap 64 on worm rod 54 is inserted into the larger first opening or section 160, and the depth 40 is then rotated so that the groove 63 under cap 64 is locked in the smaller second opening or section 162 in depth stop 40. When the router 10 is then placed in the inverted position, the worm rod 54 will help hold the weight of the router housing 22 to alleviate some of the need for the operator to support the weight of the housing 22 and the motor when adjusting the cutting height.

In order to adjust the cutting height in such an inverted position, the operator rotates the course adjustment knob 114 so that gear 72 is rotated and travels along the worm rod 54. This pulls the housing 22 along with the gear 72 to a desired rough cutting depth. The lever 102 is then rotated to lock the gear 72 in position, and the fine adjustment knob 134 is used to rotate worm rod 54 for precisely adjusting the cutting depth. When the fine adjustments are made, rotation of the fine adjustment knob 134 forces gear 72 to act like a nut and travel up or down worm gear 54 along with the housing 22 to a selected position relative the base 30. As described in more detail below, the post lock mechanism 14 is preferably released during inverted operation, and a compression spring defeat mechanism is also preferably used in the inverted position to defeat the compression spring.

Post Lock Mechanism

The post lock mechanism 14 of the present invention is shown in FIGS. 1, 11–13 and 20–21. The post lock mechanism 14 secures the housing 22 in a position relative to the base 30 by engaging one of the guide posts 32. The mechanism 14 includes screw 172 having a first end 170 movably engagable with one of the guide posts 32. Preferably, the screw 172 is made of brass and the guide post 32 is made of steel.

Figure 11:
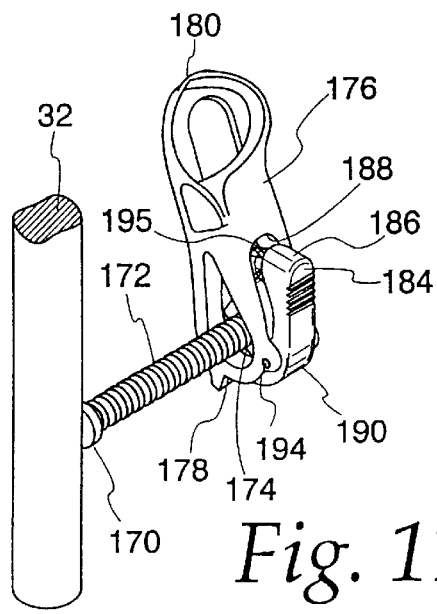
FIG. 11 illustrates the post lock mechanism of the present invention shown in one position.
Figure 12:
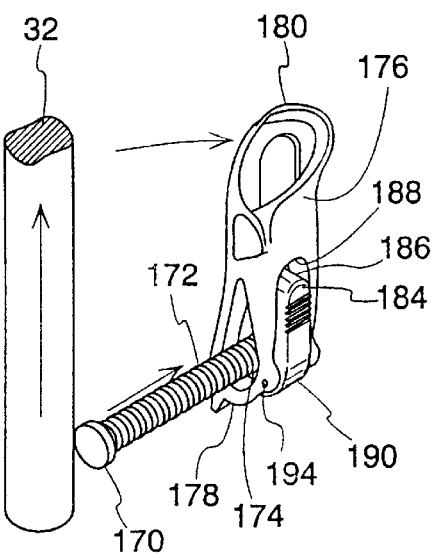
FIG. 12 illustrates the post lock mechanism of FIG. 11 in a second position.
Figure 13:
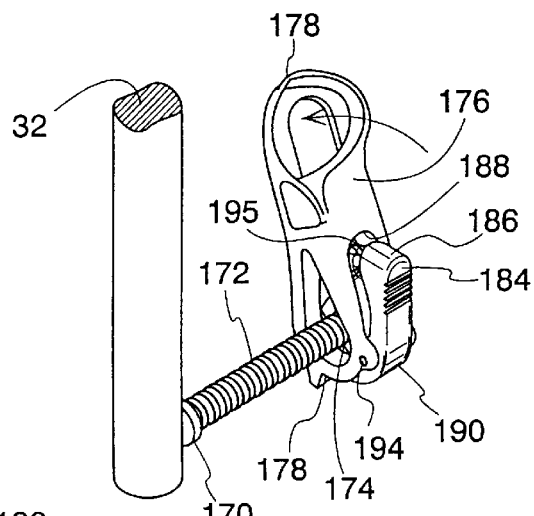
FIG. 13 illustrates the post lock mechanism in yet another position.

The screw 172 has a second end 174 secured to a lever 176 having first and second ends 178 and 180. The first end 178 has a hole 179 into which end 174 of screw 172 fits so that the lever 176 rotates the screw 172. End 180 of the lever extends out from the housing 22 for actuation by a user. The user pushes end 180 of lever 176 to rotate screw 172 so that it is fixed tightly against post 32 as shown in FIG. 11 to fix the relative position of the house 22 to the base 30. As shown in FIG. 12, the user pushes on end 180 of lever 176 to rotate the screw 172 in the opposite direction to draw the screw 172 away from shaft 32 in order to release the housing 22 relative to the glide post 32 and base 30.

The post lock mechanism 14 further includes a torsion spring 182 (FIGS. 2 and 20) that biases lever 176 and shaft 172 to the locked position against post 32 to secure the relative position of the housing 22 to base 30. In use, the lever 176 and shaft 172 keep the housing 22 fixed relative to base 30, and the operator uses lever 176 to defeat the post lock mechanism to permit movement of the housing 22 relative to the base 30 on guide post 32. Thus, the post lock lever mechanism 14 is normally in the locked position, and the lever 176 is actuated to release housing 22 for movement on guide post 32.

Figure 20:
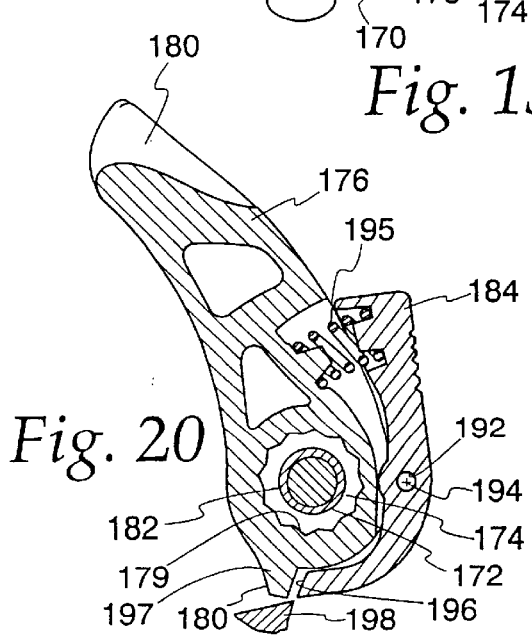
FIG. 20 shows a cross-sectional view of the post lock mechanism in one position.
Figure 21:
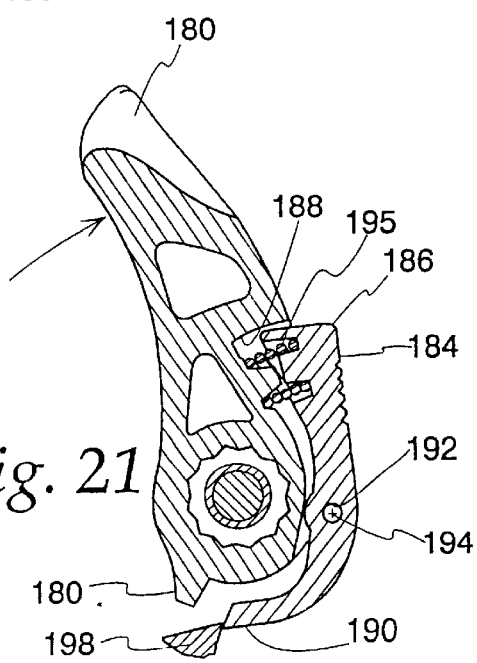
FIG. 21 shows a cross-sectional view of the post lock mechanism in a second position.

The post lock mechanism 14 also includes a latch 184 for holding the post lock lever 176 in the open position against the force of torsion spring 182. The latch 184 is mounted in an opening 188 on lever 176, and a pin 194 pivotally connects a mid-portion 190 of latch 184 to the lever 176. A spring 195 is positioned between a first end 186 of latch 184 and the lever 176 for biasing the first end 186 of latch 184 outward. As shown in FIG. 20, the spring 195 biases the latch 184 to pivot about pin 194 so that the distal end 196 of latch 184 is pressed tight against lever 176 and is generally flush with projection 197 at the end of lever 176. In such a position, the lever 176 can be rotated without latch 184 engaging a boss 198 on the housing 22 of router 10. When a user presses down on a first end 186 of latch 184, the distal end 196 of lever 184 projects outwardly from lever 176 and projection 197 so that it can engage the boss 198 as shown in FIG. 21. When the latch 184 engages the boss 198, the lever 176 is locked in the open or released position so that shaft 172 is not locked against post 32 and the housing 22 can be moved relative to the post 32 and base 30.

In operation, the torsion spring 182 biases the lever 176 and screw 172 into the engaged or locked position against the guide post 32. The housing 22 is therefore held in a secured position relative to the base 30. To move the housing 22 relative to the base, the post lock lever mechanism 14 must be moved from the locked position into a released position. To do so, lever 176 is moved by the user to overcome the bias of torsion spring 182 and to rotate the screw 172 from an engaged position to a released position away from the guide post 32. When the user holds the lever 176 in this position, the user is free to move the housing 22 relative to base 30 and into a desired position.

In some circumstances, such as for inverted use of the router 10, it is desirable to defeat the lock lever mechanism and secure lever 176 in the open or released position. For such use, the user presses down on the first end 186 of latch 184 so that the opposite distal end 196 projects outward and engages boss 198 on the housing 22, which holds the lever 176 in the open or released position. The housing 22 is then free to move along the guide post 32 and relative to the base 30. To release the latch from the boss 198 on housing 22, the latch 184 is once again depressed so that the latch is removed from the boss 198. The torsion spring 182 then returns the lever 176 and the screw 172 to be engaged position against the guide post 32 to hold the housing 32 in a fixed position.

Compression Spring Defeat Mechanism

Referring to FIG. 3, a return spring 42 is provided on one of the guide post 32 and provides a spring force between the base 30 and housing 22 that biases the housing 22 away from the base 30. When it is desired to use the router 10 in the inverted position, the operator must overcome both the weight of the router 10 and the force of the return spring 42 to collapse the plunge router 10 under the work table. Typically, the combined weight of the router 10 and force of the motor return spring 42 have made it an exceededly difficult task for positioning the router 10 under a table and for adjusting the cutting height.

In order to overcome the above mentioned problems, the present invention advantageously incorporates a return spring defeat mechanism generally designated with the numeral 16 in FIGS. 3–4 and 14–19. As shown, the return spring 42 surrounds a spring rod 202 positioned within the guide post 32. The upper end 204 of the spring rod 202 includes a snap ring 206 that holds the spring 42 on the spring rod 202. The lower end 210 of the spring rod 202 includes a groove 212 under a head 214. Normally, the spring rod 202 travels with the movements of the housing 22 due to the engagement of top wall 208 of the housing 22 with the top end 204 of the spring rod 202 and the snap ring 206 that engages the spring 42.

Figure 14:
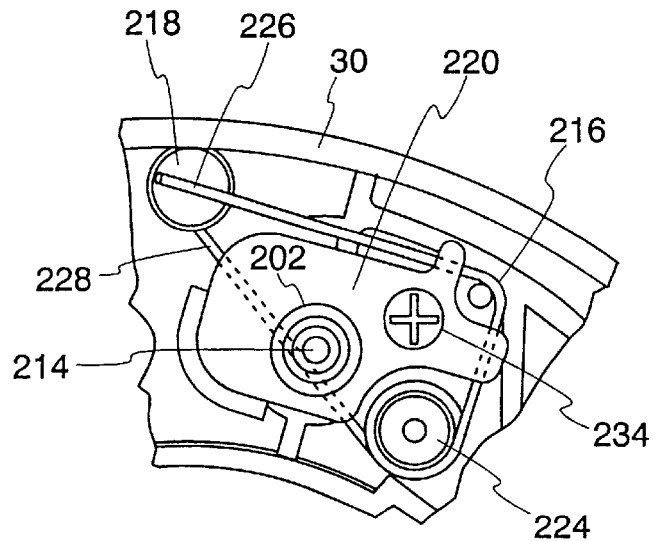
FIG. 14 illustrates a partial bottom view of the plunge base router showing the return spring defeat mechanism of the present invention.

The router 10 of the present invention advantageously includes means for defeating the force of the return spring 42. In the embodiment given in the drawings, the spring defeat mechanism includes a clip means positioned in the base 30. The clip means includes a generally triangular shaped spring clip 216, a button 218 and a cover plate 220 (FIG. 14). The spring clip 216 includes a circular portion 222 that fits over the pin 224 to position the spring clip 216 in the base 30. The spring clip 216 also includes two free ends 226 and 228 that meet at one point of the triangular shape. Free end 226 engages with the underside 230 of button 218, and free end 228 engages with the upper portion of button 218. The cover plate 220 is connected to the base 30 by a screw 234 and holds the spring clip 216 so that the free end 226 biases the button 218 toward an upper position.

Figure 18:
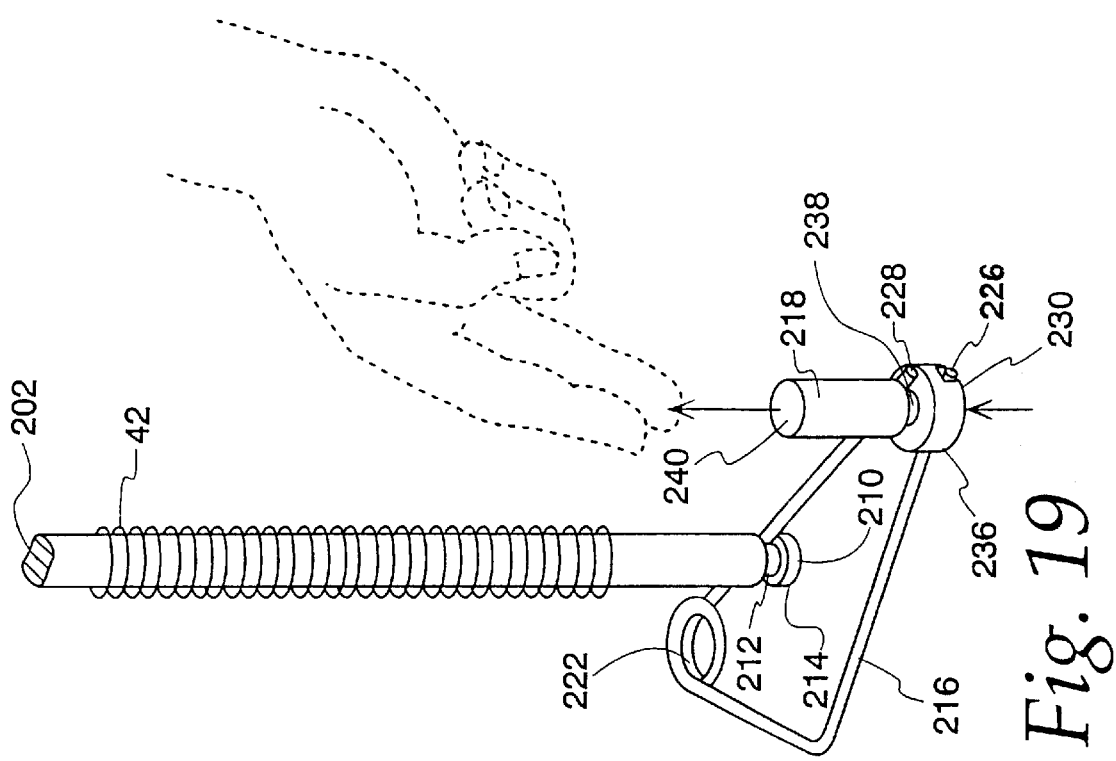
FIG. 18 shows the return spring defeat mechanism where the return spring pressure is defeated by the mechanism.
Figure 19:
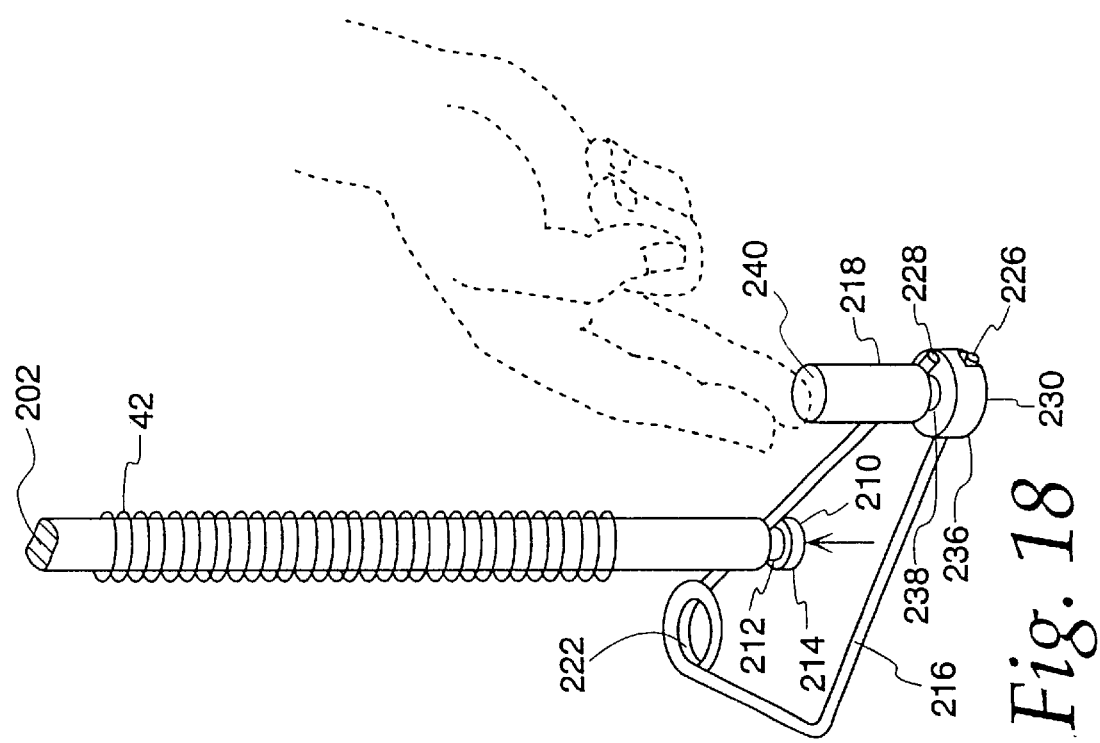
FIG. 19 shows the return spring defeat mechanism released to allow the return spring to exert pressure.

The button 218 includes a large diameter section 236 at the bottom, a small diameter section 238 in its middle, and an upper portion 240 which extends through the base 30 and above the upper surface 34. The upper portion 240 can be depressed by the user. The free end 228 of the spring clip 216 can engage with either the large diameter section 236 or a small diameter section 238 of the button 218 as shown in FIGS. 15–19. When engaged with the small diameter section 238, the spring clip 216 is in an inward position (FIGS. 18 and 19). When engaged with the large diameter section 236, the spring clip 216 is in an outward position (FIGS. 15–16). The spring clip 216 is mounted within the housing 22 so that its free end 228 is biased towards the inward position and is vertically trapped by the base 30 and cover plate 220. As shown in FIGS. 18 and 19, when the free end 228 engages the small diameter portion 238 of button 218 in the inward position, the free end 228 can also engage the groove 212 above head 214 in spring rod 202.

The operation of the return spring defeat mechanism 16 is shown in FIGS. 15–19. In FIG. 15, the user plunges the router 10 and therefore the housing 22 against the compression return spring 42. As the housing 22 moves, the rod 202 moves and the lower end 210 passes the spring clip 216 as shown in FIG. 16. In this position, the spring clip 216 is held in the outward position by the large diameter section 236 of the button 218 and does not engage rod 202. To defeat the return spring 42, the user depresses the button 218 and holds it down, as seen in FIG. 17. In this position, the free end 228 of the clip 216 moves from the large portion 236 of the button 218 to the small portion of the button 218. In FIG. 18, the user allows the spring rod 202 to move up slightly, and the spring clip 216 moves into groove 212 on rod 202. The spring clip 216 thus locks rod 202 in place. The user then releases the button 218 and the return spring 42 is defeated because the snap ring 206 on rod 202 holds the spring 42 in a compressed state. Once the return spring 42 is defeated, the user will find it much easier to position the router 10 in an inverted position under a work table.

In FIG. 19, the router 10 is shown being restored into its normal operation. In particular, the user pushes the housing 22 all the way down again which causes the rod 202 to move slightly downward. The tapered upper end of the groove 212 pushes the spring clip 216 and free end 228 outward. This allows the button 218 to automatically pop up from the spring pressure exerted by free end 226 and cover plate 220. When the button 218 is in its upward position, the large diameter section 236 is again holding the free end 228 in its outward position and the compression spring 42 is no longer defeated.

Although the present invention has been described in considerable detail with reference to certain preferred versions, other versions are possible. Therefore, the spirit and scope of the appended claims should not be limited to the description of the preferred embodiment described.

What is claimed is:

1. A plunge base router having a motor to rotate a bit, the router comprising:

a base;

a housing encasing a motor and being moveable relative to the base on at least one guide post;

a cutting depth adjustment mechanism comprising:

a rod vertically mounted on the housing and being axially moveable relative to the housing to set a cutting depth of the router, the rod including a threaded portion;

a course adjustment knob connected to a gear mounted within the housing and engaging the threaded portion of the rod, the course adjustment knob and gear being rotatable to cause axial movement of the rod relative to the housing;

a gear lock lever for locking the course adjustment knob and a gear in a selected position; and a fine adjustment knob secured to one end of the rod and being rotatable with the rod around a longitudinal axis of the rod, the fine adjustment knob and rod being rotatable, when the gear lock lever locks the gear in a selected position, to cause axial movement of the rod relative to the housing.

2. The router of claim 1 in which a first indicator ring is positioned adjacent the course adjustment knob and a second indicator ring is positioned adjacent to the fine adjustment knob.

3. The router of claim 1 in which a sleeve surrounds a portion of the rod.

4. The router of claim 3 in which the sleeve includes an indicator mark as a reference point for the fine adjustment knob.

5. The router of claim 1 in which a spring biases the gear against the threaded portion of the rod.

6. The router of claim 1 in which the fine adjustment knob is mounted on a first end of the rod and the rod includes a second end that projects downwardly from the housing, and the base includes a surface for engaging the second end of the rod such that, when the router is plunged, the second end of the rod contacts the surface on the base to set the cutting depth of the router.

7. The router of claim 6 in which the second end of the rod is fixed to the base such that the rotation of the course adjustment knob and gear causes the housing to move along the length of the rod to position the housing relative to the base and to set the cutting depth of the router.

8. The router of claim 7 in which, when the gear lock lever locks the course adjustment knob and gear in a selected position, rotation of the fine adjustment and rod causes the housing to move along the length of the rod and to position the housing relative to the base.

* * * * *